United States Patent
Gepperth et al.

(10) Patent No.: US 8,175,782 B2
(45) Date of Patent: May 8, 2012

(54) ADAPTIVE DRIVER ASSISTANCE SYSTEMS WITH ROBUST ESTIMATION OF OBJECT PROPERTIES

(75) Inventors: Alexander Gepperth, Mühlheim (DE); Jan Nikolaus Fritsch, Obertshausen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 735 days.

(21) Appl. No.: 12/276,075

(22) Filed: Nov. 21, 2008

(65) Prior Publication Data

US 2009/0138167 A1 May 28, 2009

(30) Foreign Application Priority Data

Nov. 28, 2007 (EP) .................................. 07121776
Aug. 4, 2008 (EP) .................................. 08161696

(51) Int. Cl.
*G06F 19/00* (2011.01)

(52) U.S. Cl. ............ 701/70; 701/59; 701/301; 382/155; 382/104

(58) Field of Classification Search .................. 382/155, 382/104; 706/12; 340/435, 903, 443; 348/149; 701/70, 301, 38, 408; 1/1; 715/210
See application file for complete search history.

(56) References Cited

U.S. PATENT DOCUMENTS

2004/0022416 A1* 2/2004 Lemelson et al. ............ 382/104
2010/0316283 A1* 12/2010 Greer ............................ 382/155

FOREIGN PATENT DOCUMENTS

| DE | 19844364 A1 | 3/2000 |
|---|---|---|
| EP | 1754621 A1 | 2/2007 |
| WO | WO 2006/005669 A2 | 1/2006 |

OTHER PUBLICATIONS

Edelbrunner, H. et al., "Application and Optimization of Neural Field Dynamics for Driver Assistance," 2001 Proceedings on Intelligent Transportation Systems, 2001, IEEE, Piscataway, N.J., U.S.A., Aug. 25-29, 2001, pp. 309-314.
European Search Report, EP 08161696.3, Nov. 5, 2008, 11 pages.
Gepperth, A. et al., "Computationally Efficient Neural Field Dynamics," Proceedings of the European Symposium on Artificial Neural Networks 2008, Bruges, Belgium, Apr. 23, 2008, [Online] [Retrieved on Oct. 20, 2008] Retrieved from the Internet<URL:http://www.dice.ucl.ac.be/Proceedings/esann/esannpdf/es2008-83.pdf>.

(Continued)

*Primary Examiner* — Behrang Badii
(74) *Attorney, Agent, or Firm* — Fenwick & West LLP

(57) ABSTRACT

A computer-implemented system and method for estimating properties of objects represented in digital images, comprising the steps of (a) encoding input data from a sensor in a neural map comprising neurons having numerical activation values, wherein the activation values in the neural maps have continuous time dynamics defined by an update scheme; (b) creating, adapting and deleting weights of the neural map in unsupervised, incremental manner; (c) transmitting data from an input map to an output map, based on the values of the weights; wherein each weight between the input map (IM) and a neural output map (OM) has a unique source and destination neuron; and wherein data transmission is directed; and (d) detecting correlations between the input map (IM).

7 Claims, 10 Drawing Sheets

OTHER PUBLICATIONS

Gepperth, A. et al., "Cross-Module Learning as a First Step Towards a Cognitive System Concept," 2008, pp. 1-8, [Online] [Retrieved on Oct. 23, 2008] Retrieved from the Internet<URL:http://www.gepperth.net/alexander/papers/gepperthEtA12008b_draft.pdf>.

Handmann, U. et al., "Scene Interpretation and Behavior Planning for Driver Assistance," Enhanced and Synthetic Vision 2000 at Aerosense 2000, SPIE Proceedings Series, 2000, pp. 201-212, vol. 4023.

Von Seelen, W. et al., "Scene Analysis and Organization of Behavior in Driver Assistance Systems," Proceedings of the International Conference on Image Processing, 2000, Piscataway, N.J., U.S.A., IEEE, Sep. 10-13, 2000, pp. 524-527, vol. 3.

* cited by examiner

ADAPTIVE DRIVER ASSISTANCE SYSTEMS WITH ROBUST ESTIMATION OF OBJECT PROPERTIES

RELATED APPLICATIONS

This application claims priority to European patent applications EP 07 121 776.4 filed on Nov. 28, 2007 and EP 08 161 696.3 filed on Aug. 4, 2008 which are all incorporated by reference herein in their entirety.

FIELD OF THE INVENTION

The present invention generally relates to the field of driver assistance systems (e.g., for automobiles, planes or other vehicles) and more particularly relates to a technique of conducting online learning in artificial cognitive systems, in particular adaptive driver assistance systems.

BACKGROUND OF THE INVENTION

An artificial cognitive system may be defined as a data processing system, supplied with sensor signals, e.g., video signals, performing a number of tasks and capable of reproducing one or several aspects of human performance with respect to those tasks.

Some aspects of human performance are especially relevant in the context of an adaptive driver assistance system. First, the ability to learn from previous experiences and to use what has been learned to successfully handle unknown but qualitatively similar tasks or situations. Second, robustness against incomplete, inconsistent or distorted input data when performing a task in a real-world scenario, instead of an artificial one. Third, the ability to produce results even in critical situations, where said situations can arise due to strong variations in the system's input data (which usually come from observing the external world), or due to impaired performance of one or several internal processing steps.

In any case, a breakdown of the driver assistance system must be avoided. Finally, of particular relevance is the universal possibility to incrementally extend the driver assistance system by new functions, partly or wholly specified by learning procedures, which can access and use all data that is contained within the driver assistance system without additional design efforts.

A promising approach for implementing the above features in an adaptive driver assistance system is to use a neural network. The basic concepts of neural field dynamics in the discrete and continuous case, as well as of learning mechanisms operating on neural fields, have been formulated in Amari, S. "Dynamics of pattern formation in lateral inhibition type neural fields", Biological Cybernetics 27:77-87, and Amari, S. "Mathematical foundations of Neurocomputing", Proceedings of the IEEE 78:1443-1463; Taylor, J. G. "Neural 'bubble' dynamics in two dimensions: foundations", Biological Cybernetics 80:393-409 which are incorporated by reference herein in their entirety.

More specifically, the modelling approach of Amari dynamics includes the concepts of cooperation and competition, as well as attractor dynamics. The concept of neural cooperation and competition implies a similarity measure on stored data, which is used to iteratively suppress similar and enhance dissimilar information. This leads to a final stable network state where the stored information is largely free of redundancies. Such stable states are furthermore characterized by a considerable robustness against noise or inconsistent inputs, since the cooperation and competition principles in the network push the system back to stability in such cases. This is due to the fact that the neural networks as proposed by Amari implement attractor dynamics where it can be shown that stable states always have this robustness property.

However, the methods described by Amari et al. only model single neural sheets. Furthermore, these references do not address the way data is encoded.

The advantages and cognitive properties of representations based on Amari dynamics or similar dynamics have been discussed in, for example, Cisek, P. "Integrated neural processes for defining potential actions and deciding between them: a computational model. Journal of Neuroscience 26:9761-9770; Engels, C. et al. "Dynamic fields endow behavior based robots with representations", Robotics and Autonomous Systems 14:55-77; and Erlhagen et al. "Dynamic field theory of movement preparation", Psychological Review 109:545-572 which are incorporated by reference in their entirety. However, these publications describe comparatively small systems used for conceptual demonstration only. The issue of learning is not addressed in these references, neither is any mechanism for it.

Simple learning mechanisms are discussed in Konen et al. "A fast dynamic link marching algorithm for invariant pattern recognition", Neural Networks 7:1019-1030 which is incorporated by reference herein in its entirety. The learning mechanism employs the dynamic properties of dynamic representations as well as a maximum-detection scheme for identifying which weight should be adapted. However, the above learning mechanism does not employ neural maps, the weights between two sheets have an all-to-all connectivity from the beginning and there is no approximation scheme that exploits the intrinsic blob-forming properties of Amari dynamics. In addition, the article by Konen et al. primarily deals with unstructured inputs from visual sensors.

In addition, German patent DE 19 844 364 (M. Giese) which is incorporated by reference herein in its entirety discloses a system of neural sheets performing transformations between various coordinate systems, where data in sheets is represented by population codes, i.e., a common data encoding scheme (CDES), where the sheets possess time dynamics similar to Amari dynamics and information is transmitted between multiple sheets. However, DE 198 44 364 does not discuss a learning system (LS).

SUMMARY OF THE INVENTION

The present invention provides an adaptive driver assistance system with efficient estimation of scene properties necessary for functions in the context of "intelligent vehicles".

This is achieved in some embodiments by a method and a device according to the independent claims. Advantageous embodiments are defined in the dependent claims.

Using the proposed technique, driver assistance systems gradually develop the capability to estimate several interdependent quantities which are highly relevant for driver assistance systems operating in "intelligent vehicles".

The interdependency of the desired quantities is utilized by the invention and used to improve the quality of the estimates beyond the point that could be achieved when estimating all quantities independently.

The quantities in question are all related to the detection of relevant scene objects (such as, for example, cars or pedestrians), namely: (1) precise location, (2) identity, and/or (3) distance.

Input data coming from specified sensors are processed using the learning technique in order to control specified actuators, using the estimated quantities in order to guide actuator control.

The proposed learning technique consists of a novel memory-space-efficient learning scheme (LS) between neural maps (sets of two-dimensional sheets of computing elements termed "neurons"), where the neural maps are subject to a dynamics of time evolution according to an extension of Amari dynamics. The encoding of information into the neural maps is performed according to a data encoding scheme (CDES). According to the invention, the learning scheme (LS) may specifically be formulated to capture correlated activity between two or more neural maps and exploits the Amari dynamics of the neural maps in order to justify some simplifying assumptions, leading to a greatly reduced number of parameters (termed "weights") to be adapted by the learning scheme (LS). No implicit assumptions about the nature of the data used for learning need to be made.

As long as the common data encoding scheme (CDES) is adhered to, new sources of information can be provided to the learning scheme (LS) at any time, allowing to increase the complexity of the learning task incrementally. The learning scheme (LS) also possesses notable self-organization capabilities, meaning that it is especially suited for unsupervised and online learning scenarios where no ground-truth data is available.

The Amari dynamics may be re-parameterized during operation, leading to increased flexibility and adaptability in its already quite rich information processing capabilities which include fusion of and competition between stored information.

The method and device according to the invention may be advantageously employed in all fields where artificial cognitive systems must autonomously or semi-autonomously deal with tasks in the "real-world", most particularly in driver assistance systems operating in "intelligent vehicles". In applications where tasks are usually only partly well-defined or of a complexity that makes it difficult to design solutions for them, cognitive systems using this technique will be able to achieve new qualities of performance.

In an embodiment, the invention integrates three subsystems, in each of which the proposed learning technique can be employed to achieve a specific purpose, namely subsystems for: (1) learning a mapping between different spatial coordinate frames; (2) learning a association of object identity and object location; and (3) learning an association of apparent object size, object identity and object distance.

These subsystems may be combined in order to estimate the previously mentioned quantities more robustly and reliably than it would be possible using each subsystem in isolation. The obtained robust estimates are directly useful for actuator control, particularly in driver assistance systems. A simple logic may initiate a braking maneuver when an object identified as a pedestrian (from robust object identity estimation) is detected by vision/range sensors (using robust coordinate transformation and fusion) at a distance (from robust depth estimation) lower than a safety threshold.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

These and other aspects and advantages of the present invention will become more apparent when studying the following detailed description of an embodiment of the present invention, in connection with the drawing, in which.

DETAILED DESCRIPTION OF THE INVENTION

Figure 1:
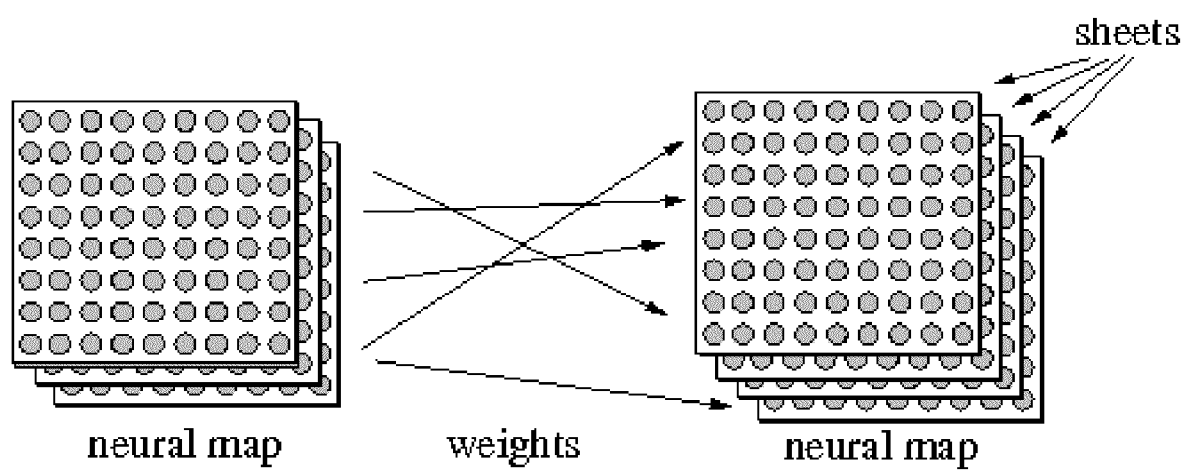
FIG. 1 shows the basic entities employed by the invention: neural maps comprising sheets and weights.

A preferred embodiment of the present invention is now described with reference to the figures where like reference numbers indicate identical or functionally similar elements. Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 shows the basic entities employed by embodiments of the invention: neural maps comprising sheets and weights.

No assumptions are made about the system in which the inventive learning method operates; nevertheless its advantages are best understood when operating it in a large system of processing modules exchanging data. Data may be modelled by "neural maps", which are sets of two-dimensional sheets composed of discrete elements, here termed "neurons". Data transmission from a neural map termed "input map" or "source map" to an "output map" or "destination map" may be governed by adjustable parameters termed "weights"; each weight implements a unique connection between a source neuron and a destination neuron, each in a certain sheet of the source and destination maps.

Central to learning in an artificial cognitive system, e.g. an adaptive driver assistance system, is the possibility of information exchange between distributed subsystems; this will make it possible to learn from information derived in different subsystems, a quality which is not typical of conventional artificial cognitive system architectures.

According to one aspect of the invention, data used by a learning scheme (LS) may be encoded according to a common data encoding scheme (CDES). The use of complex, structured data types as used in modern programming languages like C++ or PASCAL ("struct", "record", "class") may be avoided, and only two-dimensional arrays of floating point numbers may be used as a basic type instead. These are the neural "sheets" mentioned previously; on these simple data structures, the common data encoding scheme (CDES) may then encode information from different sources in a uniform way.

Figure 2:
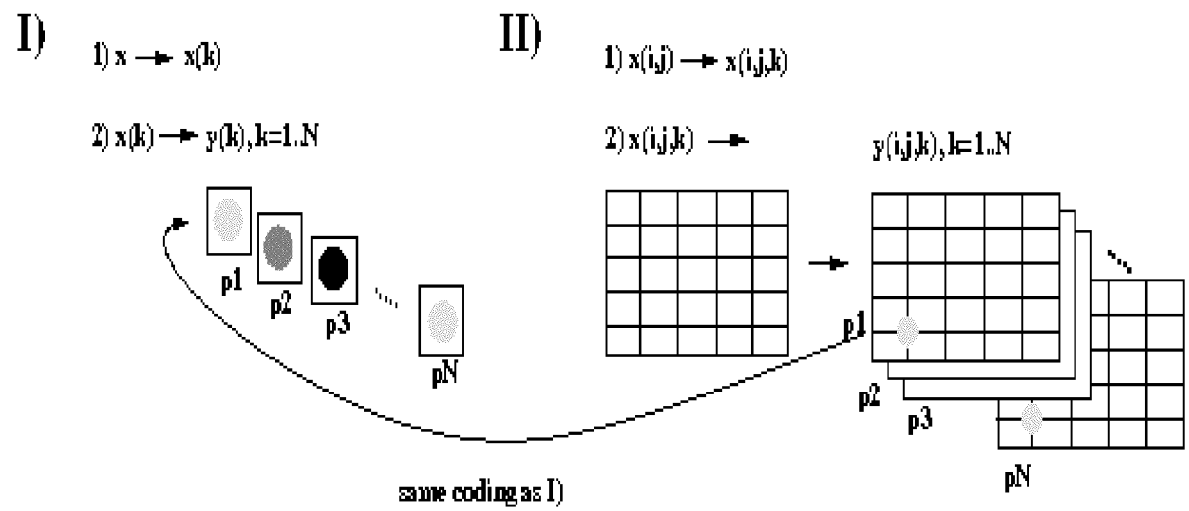
FIG. 2 illustrates the use of a population coding scheme as a common data encoding scheme (CDES) in accordance with an embodiment of the invention.

FIG. 2 illustrates the use of a population coding scheme as a common data encoding scheme (CDES). According to an aspect of the invention, the common data encoding scheme (CDES) may encode two-dimensional arrays of numbers into a set of two-dimensional arrays of floating point numbers using a population coding strategy, wherein any number is discretized, and each discrete value may be represented by a localized activation in a set of two-dimensional arrays. This set constitutes the previously introduced "neural map". Single numbers and one-dimensional arrays of numbers may be treated as two-dimensional arrays with one entry, or as with only one row.

An example of the steps of the population coding scheme are:

I) transformation of a single number x into the common data encoding scheme (CDES). The number x may be replaced by a vector of numbers, each representing the similarity of x to a certain value. As a measure of similarity, often a Gaussian function is used: $s(x,x_0)=e^{-\alpha(x-x_0)^2}$ II) transformation of a two-dimensional array into the common data encoding scheme (CDES). At every point, the method of I) is applied to form a multi-sheet representation of the originally two-dimensional data.

This way of representing data facilitates integrative learning, meaning the acquisition of information by combining information within a cognitive system. This would usually be problematic due to the different data structures used in different subsystems. Furthermore, the use of a pervasive common data encoding scheme (CDES) makes it possible to use the same learning algorithm (although possibly with different parameterizations) throughout the whole system.

According to an embodiment of the invention, data stored in neural maps may be subject to autonomous dynamics. Since all data may be encoded in the common data encoding scheme (CDES), it is feasible to use a common dynamics (i.e., a defined behaviour over time), although possibly subject to different parameterizations. In this way, the time evolution and the reaction of neural maps to arbitrary inputs may be defined unambiguously, i.e., the numerical value associated with each element of a neural map ("activation value") may be defined at all times by the dynamics. The purpose of the dynamics is to perform common operations on the stored data, thus setting a reference of how data should be prepared by specialized algorithms in order to achieve at least some of the above-mentioned functions. The common data encoding scheme (CDES) may be designed in such a way that it interacts with and supports the chosen data dynamics naturally.

More particularly, an extended two-dimensional (see Taylor, J G, referenced above) version of Amari (Amari, S, referenced above) dynamics may be used for realizing the aforesaid common dynamics. Originally proposed as a model of cortical brain function, Amari dynamics also possesses the ability to perform basic cognitive functions like cue integration/competition or data fusion. The proposed extension of Amari dynamics concerns the competitive/cooperative interactions between different neural sheets as opposed to interactions only within a single sheet.

Figure 3:
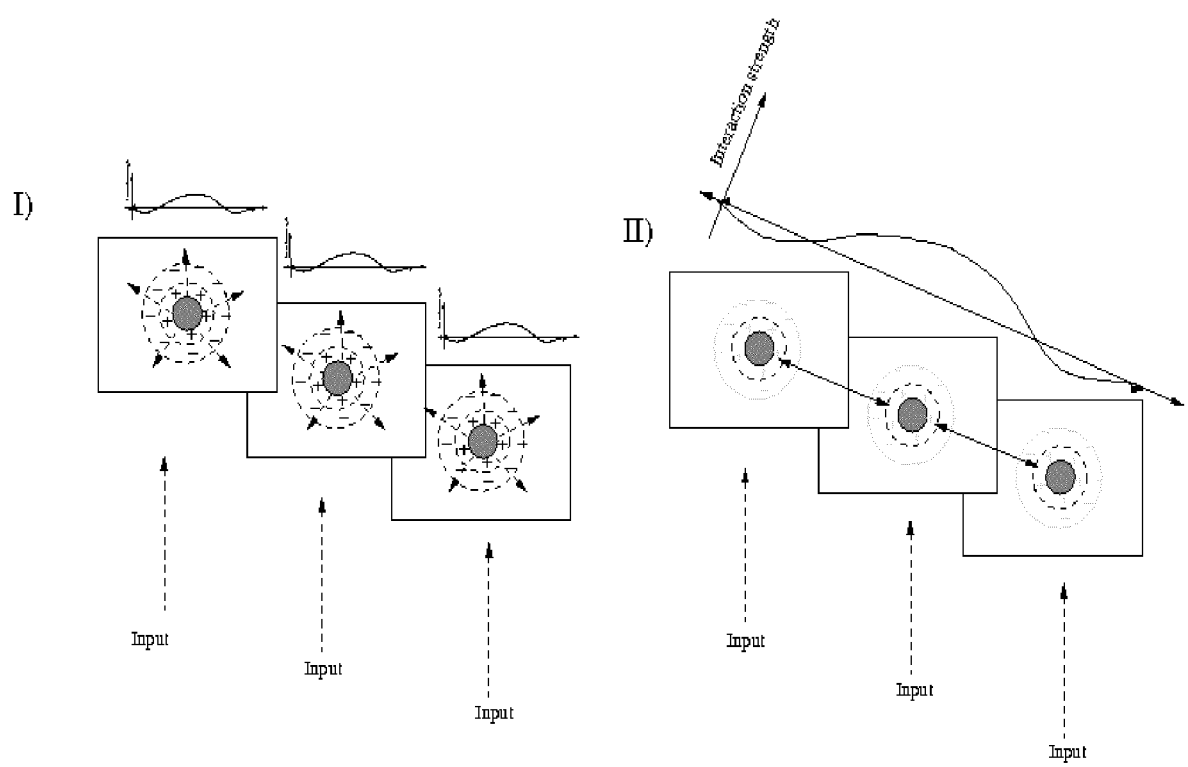
FIG. 3 is an illustration of the extended Amari dynamics according to an embodiment of the invention.

FIG. 3 is an illustration of an extended Amari dynamics according to an embodiment of the invention. Central to Amari dynamics is the concept of cooperation/competition. Competing neurons try to reduce each other's values, whereas cooperating neurons try to enhance them. Whether neurons compete or cooperate is determined by the values of the used interaction kernel functions ("interaction strength") which depend on the distance between two neurons, either within a single neural sheet or the inter-sheet distance. Typical examples of such functions are depicted both on the left-hand side where the competition within one neural sheet is shown, as well as on the right-hand side where competition between neurons at the same position in different neural sheets is visualized.

According to the invention, the parameterization of Amari dynamics may be changed such that different dynamical behaviour results in different cognitive functions.

In other words, the inventive extension of the known Amari dynamics concerns the existence of competitive or cooperative interactions not only within one sheet of a neural map, but also between neurons at the same position of different sheets. Just as the within-sheet interactions in standard Amari dynamics, these interactions are formulated in terms of an interaction kernel function determining the strength and type of the interaction (completion if functions is smaller than zero, cooperation if it larger, no influence when it is zero).

Figure 4:
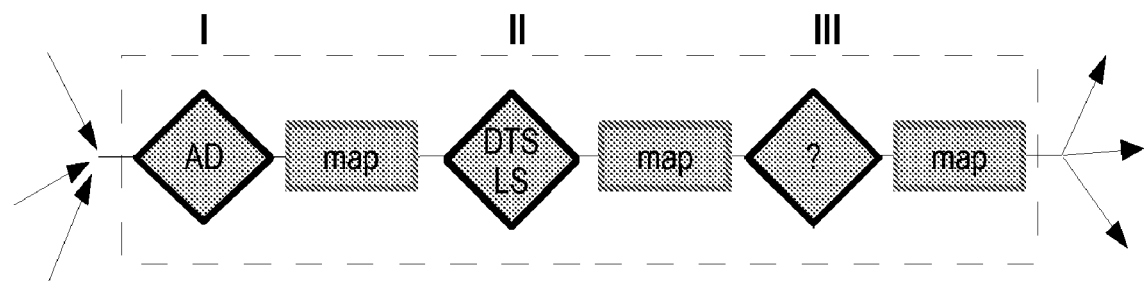
FIG. 4 shows a building block of the simulation scheme according to an embodiment of the invention.

FIG. 4 shows a building block of a simulation scheme for the proposed invention, symbolized by the dashed box. The whole processing may be constructed from such building blocks.

The in-and outgoing arrows indicate data communication. The numbers above the processing modules indicate simulation stages, and the question mark in the rightmost module indicates an arbitrary algorithm. It may also be omitted, in which case it can be considered to be the identity transform. The building block principle effectively prevents modules of the same stage to communicate within one time step. This constrains the system, but makes a parallel distributed simulation feasible, which is especially useful in a driver assistance system.

According to a further aspect of the invention, a storage-efficient data transmission scheme (DTS) between neural maps (termed "source map" and "target map") may be employed, making use of the properties of the Amari dynamics operating on data. Because Amari dynamics produces (under certain conditions) localized areas of activation (known as "blobs") of a certain size, the number of weights required to connect two neural maps may be reduced. Since the size of blobs in neural maps governed by Amari dynamics is characterized by their (fixed) parameterization, and blob solutions have a profile similar to a Gaussian function, the whole information in that blob may be transmitted via a single weight. Therefore, much fewer weights are required to transmit all relevant information when assuming all-to-all connectivity, thus saving storage. This may be achieved by down-sampling all involved neural maps, applying the data transmission scheme (DTS) on the down-sampled versions, and up-sampling the result (i.e., the transmitted/transformed data). The up-sampled result of the data transmission scheme (DTS) may then be presented as input to the Amari dynamics governing the target map. Thereby, the down-sampling factor of both maps may be chosen to be compatible with the size of blobs occurring in both maps.

According to a another aspect of the invention, a learning method for estimating object properties may be implemented in a parallel, distributed fashion on several computers. This is a relevant scenario, since it is to be expected that the computational effort will be rather high, and thus not possible to realize using only a single machine. It is assumed that the system structure is modular, and that only three types of modules exist. These are: (A) Type I: modules simulating the dynamics of the neural maps, thus implementing the common data encoding scheme (CDES) and modeling a certain dynamic behavior generated by Amari dynamics; (B) Type II: modules implementing the data transmission scheme (DTS) and the learning scheme (LS), and (C) Type III: modules performing algorithmic processes on data stored in the system (encoded by the common data encoding scheme (CDES)) or obtained from external sources or sensors. This includes modules that just make sensor data available to the system.

The data flow in the system is assumed to be constrained in the sense that it can be constructed from one or multiple processing chains of the form (as shown in FIG. 4):

Type I→Type II→Type III

In order to be able to distribute computational load over several machines (e.g., in a standard local area network), the execution of all modules may be properly synchronized between all machines. According to the invention, a synchronizing solution based on discrete time steps may be used. It consists of three stages, where each stage corresponds to one of the three types of modules mentioned previously. Each stage executes one time step for all corresponding modules.

Time steps of all stages may be triggered by external control signals. Since modules within one processing stage do not send data to each other (by assumption), the execution order within a stage is arbitrary. Time steps of any stage are finished when all modules have signalled that they have terminated processing the current time step. In this case, a control signal may be generated and sent to the following stage. The stages may be cyclically arranged (i.e., stage I follows stage III). In order to maintain a fixed relation to physical time, it may be required that the algorithms processing each time step in all modules must be constant-time algorithms (which is the case for simulating AD, learning scheme (LS) and data transmission scheme (DTS)).

According to a further embodiment of the invention, the data transmission scheme (DTS) may be adapted and extended by an autonomous learning scheme (LS), whose goal it is to detect correlated activity in its source and destination maps.

Figure 5:
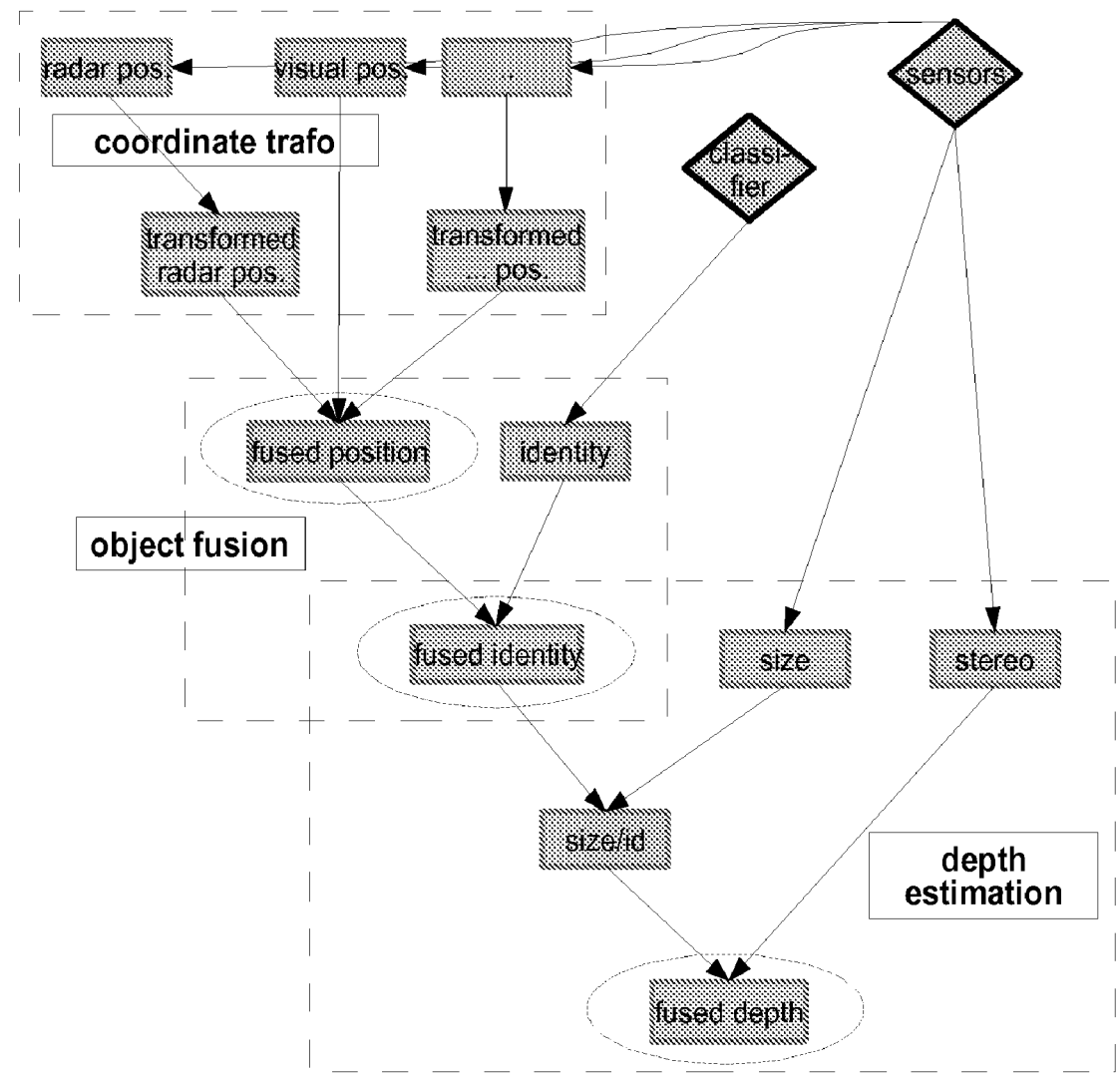
FIG. 5 is an overview of the data flow in a system according to an embodiment of the invention.

FIG. 5 summarizes the essential details of an autonomous learning method according to an embodiment of the invention. The associated data flow may be constructed from the three subsystems (indicated by dashed boxes): coordinate transformation, object fusion and depth estimation. Ellipses indicate the output quantities of the invention.

By using the above-described simplification technique, it is possible to create and adapt an appropriate data transmission scheme (DTS) from a simple initial state, with small memory and resource requirements.

The adaptation of the data transmission scheme (DTS) may take place either before or after data transmission. It is preferable to perform it after data transmission, however, since data transmission may already be used to compute quantities that are relevant to the learning scheme (LS). Again assuming all-to-all connectivity between the downsampled versions of source and destination maps, the learning scheme (LS) may calculate and apply the corresponding corrections for each weight. A possible rule for calculating weight corrections is the Hebbian learning rule with subsequent weight normalization, i.e.

$$\Delta_w = \epsilon n_{src} n_{dest}$$

where weight normalization scales all weights connecting to one destination neuron according to some criterion, e.g., having a sum of squares of 1.0. This is done to prevent weights to grow without bounds.

The learning scheme (LS) is suitable for use both when applying the previously described simplification technique and when not applying it.

Three functionalities making use of the presented methods will now be elaborated. Subsequently, it will be shown how these individual functionalities can be combined into a processing system which can potentially provide much more reliable and accurate estimates.

Figure 6:
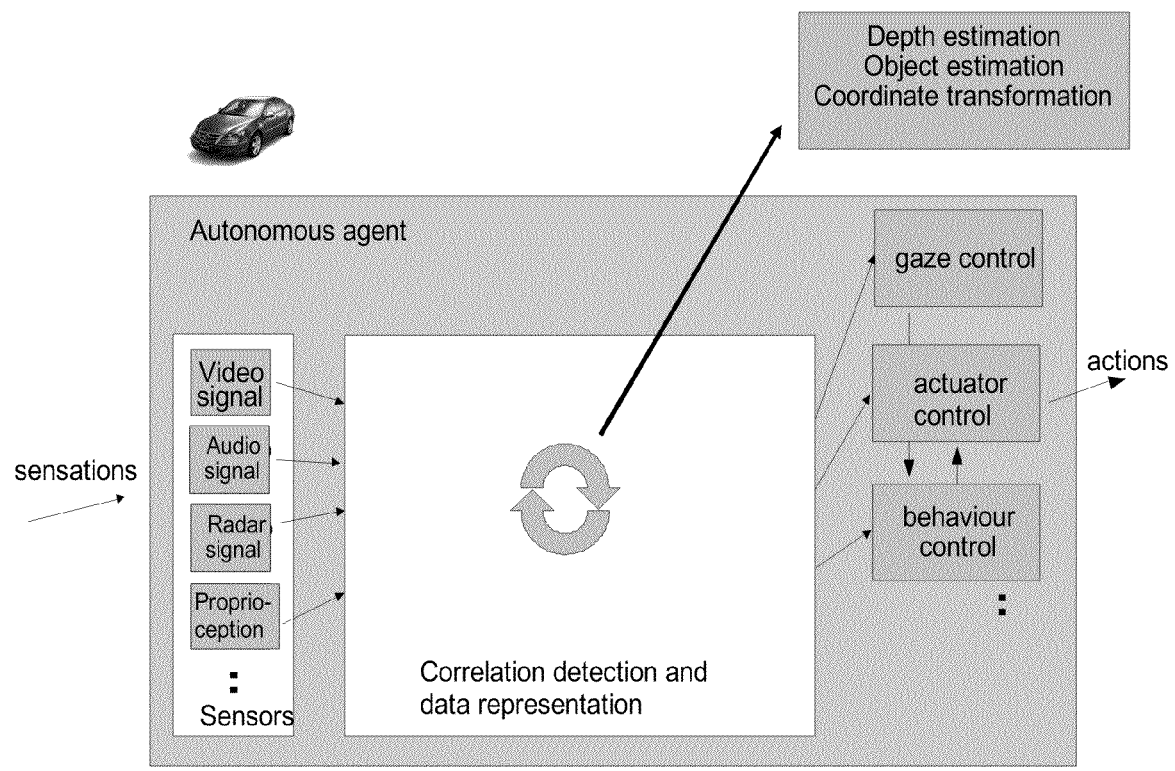
FIG. 6 shows a general system architecture for all proposed scenarios, showing the data flow from inputs to outputs and the practical results achieved by an embodiment of the invention.

FIG. 6 shows a general system architecture for all proposed scenarios, showing the data flow from inputs to outputs and the practical results achieved by an embodiment of the invention (upper-right part). It may be assumed that the following sensory information, resulting from an appropriate processing of the visual input by standard methods, are available: object identity using a standard visual classifier (e.g., [19]), object position on the vision sensor, object size on the vision sensor, object positions on the audio/radar sensors, object distance (either from stereo vision or from the radar sensor).

A key element of the invention is the module which represents incoming data and detects correlations between them, using all the techniques described previously. For this purpose, incoming sensor data may be converted into the common data encoding scheme (CDES) in an appropriate way in order to apply the proposed learning scheme (LS) on the incoming data. The learned correlations may then be read out and/or exploited by subsequent processing modules.

Figure 7:
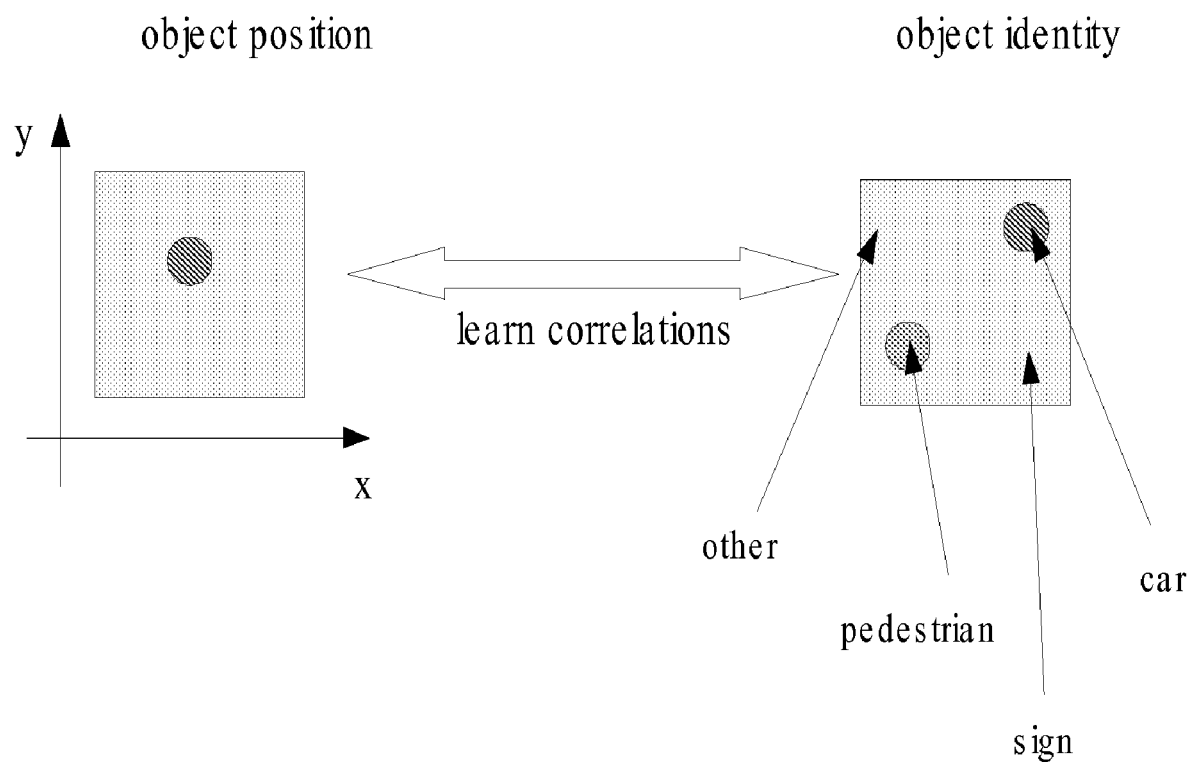
FIG. 7 is a diagram illustrating the learning of potential dependencies of object identity on location on the vision sensor according to an embodiment of the invention.

FIG. 7 is a diagram illustrating the learning of potential dependencies of object identity on location on the vision sensor according to an embodiment of the invention. For simplicity, the common data encoding scheme (CDES) may be realized by two neural maps containing one sheet each. Quantities such as object identity and position may be represented as localized activations of varying strengths. The assignments of object identities to locations in the neural sheet are arbitrary since there are generally quite few object classes to be distinguished in the envisioned scenarios. The learning scheme (LS) may then detect, during the normal course of system operations, the desired dependencies if they are present.

Another location-based functionality is the learning of the dependencies between object position and object identity. Again, learning is performed between two neural maps containing one sheet each. One map contains the object identity, converted to the common data encoding scheme (CDES), the other map contains the object location. It is often the case that certain objects occur at a restricted set of locations, a fact which can be used to overrule incorrect decisions about object identity. Object identity is usually much more error-prone than position estimation, therefore it is object identity which needs to be corrected, not object location. The location may be represented in a variety of coordinate frames which may be transformed into each other, possibly by methods outlined in the previous scenario. Usually, only one object is detected at one time in a technical system, so there is no problem of unclear correspondence between object identity and object position. Therefore, the learning method described previously can be applied to learn a mapping from object identity to object positions and vice versa. Again, this mapping need not be one-to-one. The learned associations can be used to correct object identity decisions using the data-fusion property of Amari dynamics. A example case for all functionalities will be shown in FIG. 10.

Figure 8:
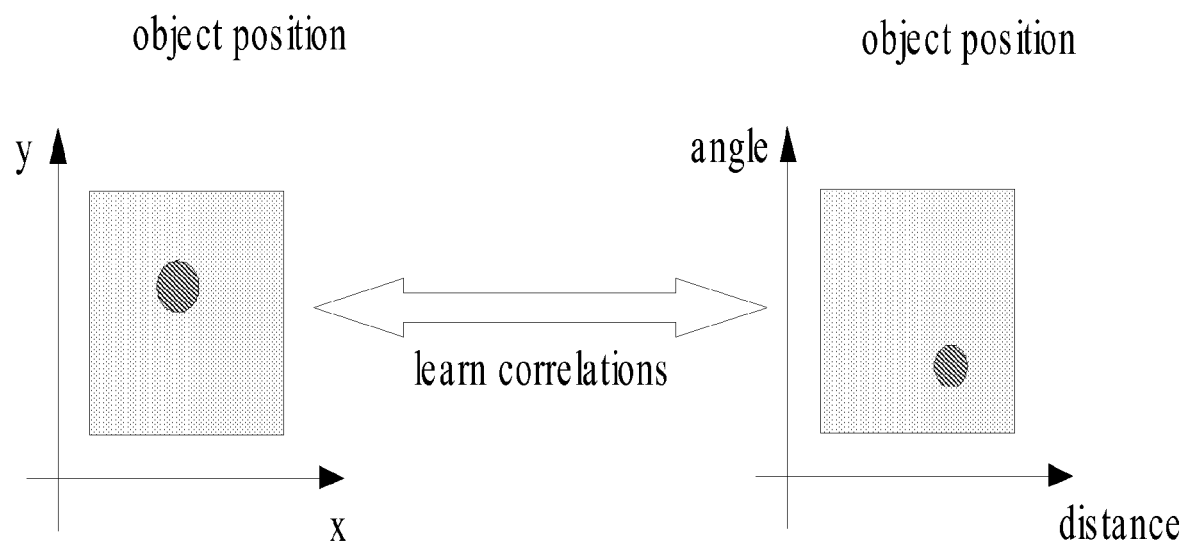
FIG. 8 illustrates the learning of dependencies between object positions in different coordinate systems, resulting, for example, from vision and radar sensors.

FIG. 8 illustrates the learning of dependencies between object positions in different coordinate systems, resulting, e.g., from vision and radar sensors. Alternatively, the scenario holds for an audio sensor, too. The invention can use vision sensors, e.g., cameras, that receive visual information in a variety of frequencies, even frequencies in the non-visual range, e.g., infrared and ultra-violet frequencies.

Dependencies between locations that are represented in different coordinate systems may be learned as follows. Assume, in the simplest case, two neural maps containing one sheet each. Each activation blob in a map may code for the location of the same object in different coordinate frames according to the common data encoding scheme (CDES). The coordinate frames can, for example, be a radar- (or audio-) derived egocentric frame and a retinotopic (camera-derived) frame. Applying the proposed learning scheme will result in the formation of connectivity between the two maps that performs a transformation between the reference frames. Wherever that transformation is not one-to-one, the connectivity may reflect this fact and project one location to all locations which are allowed by the ambiguous transformation rules. It is possible to resolve the ambiguity by adding additional information, e.g., depth information in this scenario, using the same learning mechanism.

Note that it is imperative for this functionality that the activity blobs in the two different maps represent the same object. This can be taken care of by introducing elementary "danger measures" for each coordinate frame. This could be the relative speed in the case of a radar sensor and time-to-contact calculated from optic flow in the case of a video sensor. Highly relevant and dangerous objects will exhibit high values at corresponding locations in the two maps, thus enabling the learning of the correct transformation.

A further functionality is concerned with the learning of dependencies between apparent object size, object identity and object distance, reflecting the fact that humans can judge the distance of a familiar object by evaluating its apparent size.

Figure 9:
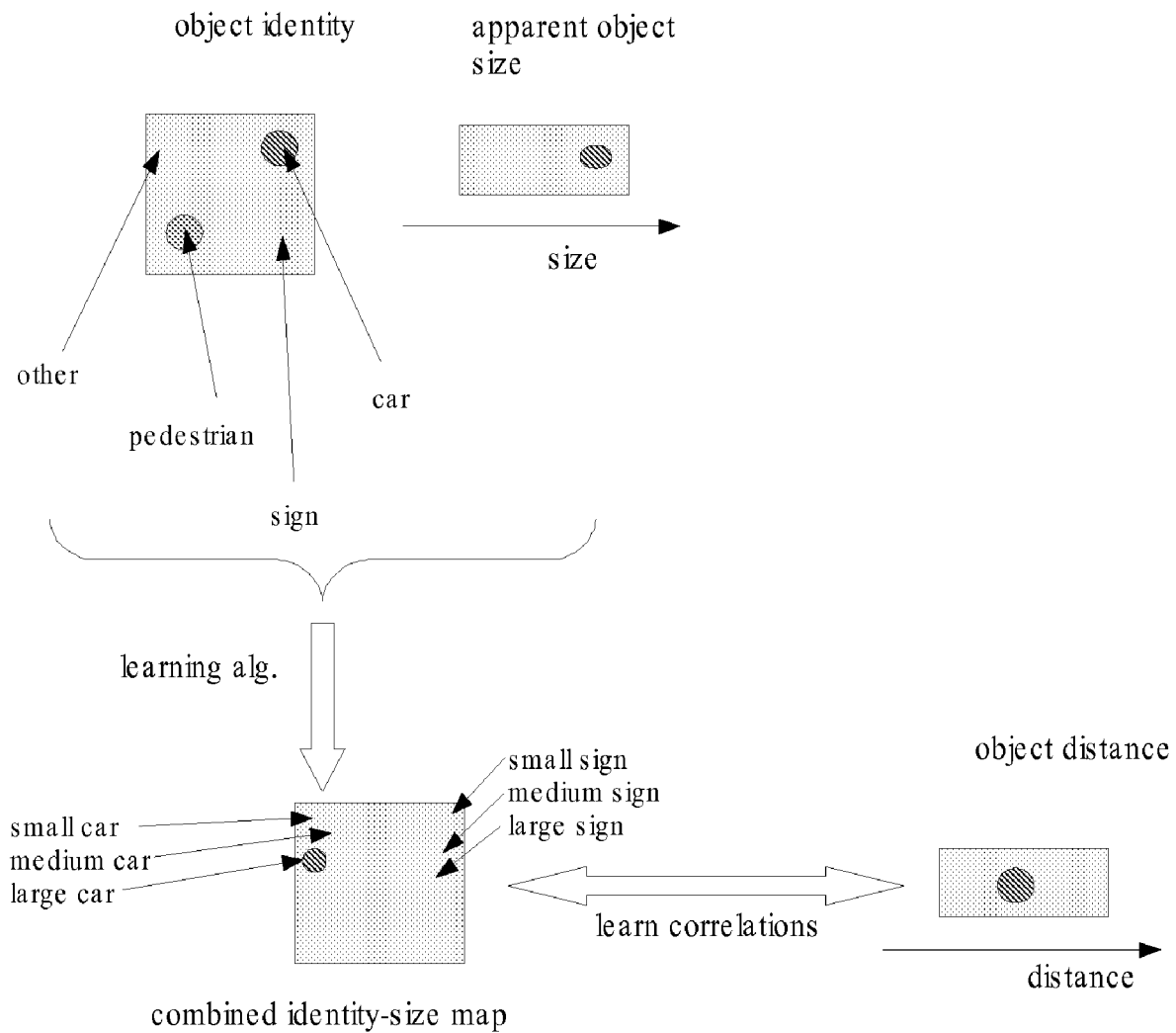
FIG. 9 illustrates the learning of dependencies between apparent object size (from a vision sensor), object distance and object identity in accordance with an embodiment of the invention.

FIG. 9 illustrates the learning of dependencies between apparent object size (from vision sensor), object distance and object identity. In order to learn and exploit correlations in this case, the neural maps for object identity and apparent object size may be merged into a single neural map using a self-organization principle which can be realized by the proposed learning scheme (LS). Correlations may then be detected by the learning scheme (LS) between the combined identity-size map and the object distance map.

More specifically this requires the detection of correlations between two neural maps: a combined size-object identity map, and a map for object distance as measured from, e.g., stereopsis, containing several sheets, each of which encodes a certain distance.

The combined size-object identity map may be formed by the learning scheme (LS) from the maps encoding object identity and object size. Using the proposed learning scheme (LS), the system will learn the dependencies between the two neural maps in order to derive, from apparent size alone, the distance of any object for which object identity can be established. The practical effect of this learning scenario is that, for known objects, a (rough) distance estimate may be given based on a monocular camera sensor only.

According to further embodiments of the invention, it is proposed to combine the functionalities described previously into an integrated system. Individual estimates of relevant quantities may be used to improve the estimates of other relevant quantities by the previously described fusion mechanism which employs the extended Amari dynamics defined on neural maps. To this effect, a neural map containing a quantity encoded by the CDES receives a sum of predictions of that quantity produced by the LS. By the cooperation and competition properties of extended Amari dynamics that were described previously, a combination of these possibly contradicting quantities is achieved and an unambiguous decision is generated An appropriate data flow structure for the combined system is visualized in FIG. 5.

Figure 10:
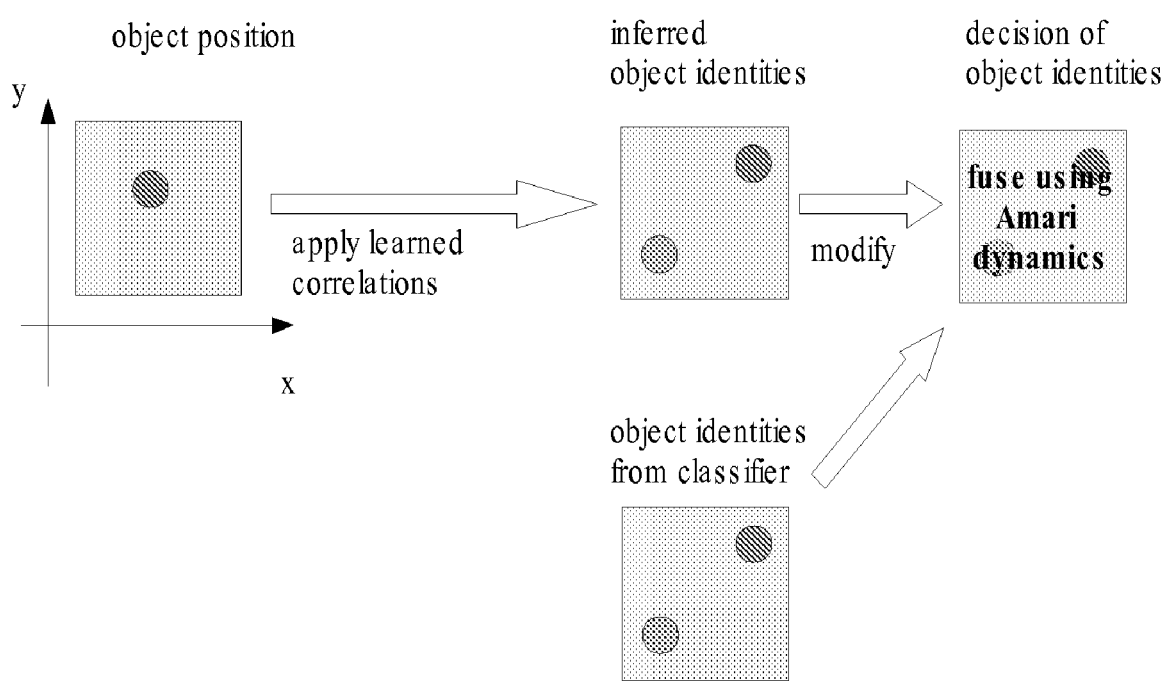
FIG. 10 shows illustrates the fusion of a measurement and a prediction of the same quantity in accordance with an embodiment of the invention.

FIG. 10 shows the fusion of a measurement (in this case a classifier decision about object identities) and a prediction of the same quantity, based on another measured quantity. Arbitrarily many predictions of a single quantity can be fused in this way in order to generate a more robust estimate of that quantity.

Inputs of the combined system are sensor data, outputs may be improved and robust estimates for object position, object identity and object distance. Due to the use of a common data encoding scheme (CDES), it is possible to interface the individual functionalities in a straightforward fashion; the same reasoning applies to the fusion of individual estimates in order to obtain more robust and correct ones.

Based on the example of the correlations between object position and identity, it is illustrated how to exploit learned correlations. Based on a measured quantity (here, object position from a vision sensor), the most probable object identities may be computed from the learned correlation information. This information is then fused by using the inferred object identities to influence (i.e., modify or "modulate") the competitive process of Amari dynamics (see above). This can lead to a correction of classification decisions based on knowledge which is not available to the classification program (i.e., the position information): "cars are never in the sky". With minor adaptations, the described fusion process may be employed for all functionalities described here.

The invention also comprises a system, mountable in a vehicle (car, plane or other vehicle) or a robot, which may learn and exploit dependencies between various sensory inputs. There correspondences may involve dependencies between detected object positions (an various coordinate frames) and their identity, as identified by an object classification program; dependencies between apparent object size as extrapolated from a camera image, object identity as computed by an object classification program, and object distance as extrapolated from a radar or stereopsis measurement; and dependencies between locations that are represented in different coordinate systems.

The learned dependencies may be used to perform or anticipate the correct transformation. The system mounted in the car may be a driver assistance system and can assist, for example in a braking system, e.g., an emergency braking system or an emergency braking maneuvering system.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

The invention claimed is:

1. A computer-implemented method for a driver assistance system for estimating properties of objects in a vehicle's environment represented in digital images received from sensors, the properties including at least one of object identity, object position, and object distance, comprising the steps of:
   in a neural map comprising neurons having numerical activation values, extracting data on object identity and data on one of the other properties of the object from the input data from the sensors, and assigning the data on the object identity to a first neural map and assigning the data on said one of the other properties to a second neural map;
   the data on the object identity being encoded in accordance with common data encoding scheme (CDES) wherein two-dimensional arrays of numbers are encoded into a set of two-dimensional arrays of floating point numbers;
   between the first and the second neural maps, performing an unsupervised learning for adapting weights that implement a unique connection between a source neuron and a destination neuron, and incrementally increasing the complexity of a learning task;
   transmitting data between the first and the second neural maps, based on the values of the weights;
   detecting correlations between the first and the second neural maps, and estimating object identity from the second neural map based on the correlations; and
   determining the object identity based on the first neural map and said estimation of the object identity.

2. The method of claim 1, wherein the step of extracting is realized by a population coding scheme.

3. A driver assistance system for vehicles or planes having computing means designed for implementing a method for a driver assistance system for estimating properties of objects in a vehicle's or plane's environment represented in digital images received from sensors, the properties including at least one of object identity, object position, and object distance, comprising the steps of:
   in a neural map comprising neurons having numerical activation values, extracting data on object identity and data on one of the other properties of the object from the input data from the sensors, and assigning the data on the object identity to a first neural map and assigning the data on said one of the other properties to a second neural map;
   the data on the object identity being encoded in accordance with common data encoding scheme (CDES) wherein two-dimensional arrays of numbers are encoded into a set of two-dimensional arrays of floating point numbers;
   between the first and the second neural maps, performing an unsupervised learning for adapting weights that implement a unique connection between a source neuron and a destination neuron, and incrementally increasing the complexity of a learning task;
   transmitting data between the first and the second neural maps, based on the values of the weights;

detecting correlations between the first and the second neural maps, and estimating object identity from the second neural map based on the correlations; and determining the object identity based on the first neural map and said estimation of the object identity.

4. A non-transitory computer readable medium comprising computer executable code which when executed by a computer performs a method for a driver assistance system for estimating properties of objects in a vehicle's environment represented in digital images received from sensors, the properties including at least one of object identity, object position, and object distance, comprising the steps of:

in a neural map comprising neurons having numerical activation values, extracting data on object identity and data on one of the other properties of the object from the input data from the sensors, and assigning the data on the object identity to a first neural map and assigning the data on said one of the other properties to a second neural map;

the data on the object identity being encoded in accordance with common data encoding scheme (CDES) wherein two-dimensional arrays of numbers are encoded into a set of two-dimensional arrays of floating point numbers;

between the first and the second neural maps, performing an unsupervised learning for adapting weights that implement a unique connection between a source neuron and a destination neuron, and incrementally increasing the complexity of a learning task;

transmitting data between the first and the second neural maps, based on the values of the weights;

detecting correlations between the first and the second neural maps, and estimating object identity from the second neural map based on the correlations; and determining the object identity based on the first neural map and said estimation of the object identity.

5. A device for estimating properties of objects in a vehicle's environment represented in digital images received from sensors, comprising:

extracting means, in a neural map comprising neurons having numerical activation values, for extracting data on object identity and data on one of the other properties of the object from the input data from the sensors, and assigning the data on the object identity to a first neural map and assigning the data on said one of the other properties to a second neural map;

encoding means for encoding the data on the object identity in accordance with common data encoding scheme (CDES) wherein two-dimensional arrays of numbers are encoded into a set of two-dimensional arrays of floating point numbers;

unsupervised learning means for performing an unsupervised learning for adapting weights, to the first and the second neural maps, that implement a unique connection between a source neuron and a destination neuron, and incrementally increasing the complexity of a learning task;

transmitting means for transmitting data between the first and the second neural maps, based on the values of the weights;

detection means for detecting correlations between the first and the second neural maps, and estimating object identity from the second neural map based on the correlations; and determining means for determining the object identity based on the first neural map and said estimation of the object identity.

6. The device of claim 5, for use in a driver assistance system in a vehicle.

7. The device of claim 6, for controlling emergency braking maneuvers of a vehicle.

* * * * *